United States Patent [19]

Latos et al.

[11] 4,301,924
[45] Nov. 24, 1981

[54] REFLECTOR UNIT FOR PHOTOFLASH ARRAY

[75] Inventors: Edward L. Latos, Mentor; Elton G. Moneymaker, Montville, both of Ohio

[73] Assignee: General Electric Company, Schenectady, N.Y.

[21] Appl. No.: 54,834

[22] Filed: Jul. 5, 1979

[51] Int. Cl.³ .............................................. B65D 21/02
[52] U.S. Cl. ..................................................... 206/520
[58] Field of Search ...................... 206/518, 519, 520; 220/236

[56] References Cited

U.S. PATENT DOCUMENTS

| 3,195,770 | 7/1965 | Robertson | 220/23.6 |
| 3,386,608 | 6/1968 | Diller | 220/23.6 |
| 3,416,695 | 12/1968 | Bessett | 206/520 |
| 4,123,023 | 1/1979 | Hanson | |

*Primary Examiner*—George E. Lowrance
*Attorney, Agent, or Firm*—Norman C. Fulmer; Lawrence R. Kempton; Philip L. Schlamp

[57] ABSTRACT

A reflector unit is shaped from a plastic sheet to provide a plurality of individual reflectors having raised radiation barriers between adjacent reflectors. Ribs are provided in the radiation barriers to prevent stacked reflector units from sticking together during manufacture of flash arrays.

4 Claims, 2 Drawing Figures

REFLECTOR UNIT FOR PHOTOFLASH ARRAY

BACKGROUND OF THE INVENTION

The invention is in the field of photoflash arrays. U.S. Pat. No. 4,133,023 to Hanson discloses a photoflash array, of the Flip Flash type, having a reflector unit configured to provide a plurality of individual reflectors to prevent "sympathetic" flashing of lamps due to heat and/or light from an adjacent flashing lamp. An economical way of manufacturing the reflector units is to pressure-form heated plastic sheet material, such as with a mold and a vacuum and/or air pressure. The reflector unit is generally rectangular, and the individual reflectors and radiation barriers are transversely oriented along the length of the unit. The radiation barriers have a tapered configuration so that the reflector units can be stacked in a nested manner for compact storage prior to being used in manufacturing flash arrays. Some manufacturing difficulties have been incurred due to the stacked reflector units sometimes sticking together so tightly, because of the nested tapered radiation barriers, that it is difficult to remove the top unit, such as by a vacuum lifting arm, for positioning it into a flash array.

SUMMARY OF THE INVENTION

A principal object of the invention is to provide improved reflector units for photoflash arrays, and to facilitate and improve the manufacturing process.

The invention comprises, briefly and in a preferred embodiment, a reflector unit for a photoflash array, shaped from a plastic sheet to provide a plurality of individual reflectors having raised tapered radiation barriers between adjacent reflectors. Ribs are provided at the concave apexes of the radiation barriers so as to permit nested stacking of the reflector units and at the same time preventing sticking together of the stacked units. Preferably the ribs are transverse to the apex lines of the barriers, and are formed during the pressure-forming of the reflector unit.

DESCRIPTION OF THE PREFERRED EMBODIMENT

Figure 1:
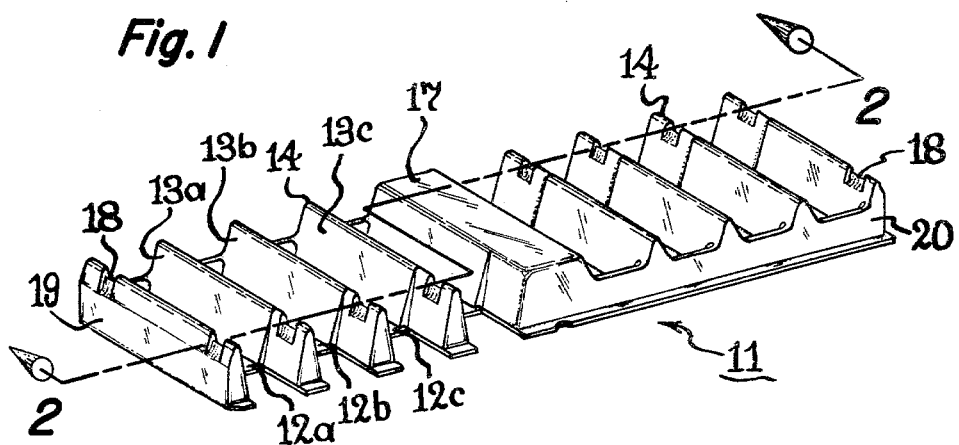
FIG. 1 is a perspective view of a preferred embodiment of the invention.

The reflector unit 11 is generally the same, and for the same purpose, as the reflector unit 41 in the above-referenced Hanson patent which is incorporated herein by reference. The reflector unit 11 is generally rectangular and is made from a thin sheet of plastic shaped to provide a plurality of transversely positioned individual reflectors 12a, 12b, 12c, etc., and transversely positioned raised radiation barriers 13a, 13b, 13c, etc. are respectively provided between adjacent individual reflectors. The reflector unit 11 is made by a pressure-forming technique in which a sheet of heated plastic is placed over a mold and air pressure is applied over the plastic and/or vacuum is applied between the plastic and the mold, so as to pull down portions of the plastic sheet into mold cavities to form the individual reflectors 12a etc., and at the same time forming the radiation barriers 13a, etc. The radiation barriers 13a, etc. are shaped so as to taper divergently from their front apexes 14, as shown. This facilitates the pressure forming of the reflector unit, and also facilitates removal of the shaped reflector unit from the mold. The tapered shapes of the radiation barriers also function as part of the individual reflectors, and help in the forward reflecting of light from lamps when flashed, there being a flash lamp in each individual reflector in a completed unit, as disclosed in the above-referenced Hanson patent. Preferably the reflector unit is made from white plastic material.

Figure 2:
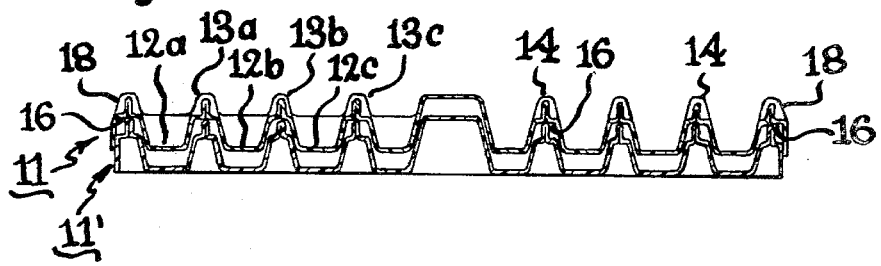
FIG. 2 is a cross-sectional view taken on the line 2—2 of FIG. 1.

In accordance with the invention, ribs 16 or webs are formed in the concave back sides of at least some of the radiation barriers near their apexes 14, so that when a plurality of reflector units 11 are stacked in nested manner, as shown in FIG. 2, the ribs 16 of each reflector unit rests on apexes 14 of radiation barriers of the reflector unit beneath. This prevents the above-described undesirable wedging together and sticking together of adjacent reflector units, and thus the invention permits stacking and nesting of reflector units for storage and for facilitating their placement into flash assemblies, and permits automatic equipment, such as vacuum arms, to readily lift reflector units from the top of the stack and place them in flash assemblies. The vacuum lifting may be applied to a flat area 17 of the unit.

The ribs 16 are readily formed during pressure forming of the reflector units, by providing notches in the forming mold; the pressure forming of the reflector unit also forms the ribs 16, and in so doing forms corresponding grooves 18 on the sides of the apexes 14 of the radiation barriers 13a, etc. In a preferred embodiment, two ribs 16 are provided in each of the end barriers 19, 20, and one rib 16 is provided in each remaining barrier.

The webs 16 are formed, during the pressure-forming step, by forcing together small areas of plastic on opposite sides of the radiation barrier near its apex, thus forming webs transverse to the apexes. The webs 16 should preferably be sufficiently narrow, such as 0.08 inches wide, so that the plastic material does not break away to form cracks or holes at the web edges.

While preferred embodiments of the invention have been shown and described, various other embodiments and modifications thereof will become apparent to persons skilled in the art, and will fall within the scope of the invention as defined in the following claims.

What we claim as new and desire to secure by Letters Patent of the United States is:

1. A reflector unit for a photoflash array, comprising a sheet-like member shaped to provide a plurality of individual reflectors and a plurality of tapered radiation barriers respectively between adjacent individual reflectors, each of said radiation barriers comprising a pair of walls tapering to an apex at the front of the reflector unit, wherein the improvement comprises mutual inward deformation of the pair of walls of one or more radiation barriers in a region at the apex thereof thereby forming one or more ribs in the concavity and near the apex or one of more of said radiation barriers so as to permit nested stacking of a plurality of said reflector units and prevent adjacent reflector units from wedging together.

2. A reflector unit as claimed in claim 1, in which said reflector unit is generally rectangular and in which said individual reflectors and said radiation barriers are elongated, mutually parallel, and transverse with respect to the length of said reflector unit.

3. A reflector unit as claimed in claim 2, in which two of said ribs are formed in each of the end radiation barriers of the reflector unit.

4. A reflector unit as claimed in claim 1, in which said sheet-like member is a white plastic material.

* * * * *